Patented Dec. 15, 1931                                                1,836,568

UNITED STATES PATENT OFFICE

PHILIP G. WRIGHTSMAN, OF CHESTER, PENNSYLVANIA, ASSIGNOR TO E. I. DU PONT DE NEMOURS & COMPANY, OF WILMINGTON, DELAWARE, A CORPORATION OF DELAWARE

NITRATED GLUCOSIDE EXPLOSIVE AND PROCESS OF PRODUCING THE SAME

No Drawing.    Application filed December 20, 1927. Serial No. 241,456.

My invention relates particularly to explosives obtained by nitrating solutions of glucosides and carbohydrates in polyhydric alcohols and has for its object the production of liquid explosives possessing satisfactory properties for use in dynamites.

Explosives prepared by nitrating solutions of glucosides in polyhydric alcohols are covered in U. S. Patents No. 1,583,895, 1,630,577 and 1,630,578 granted to Moran. Nitrated glucosides have the advantage of being cheaper than nitrated polyhydric alcohols and more stable than nitrated sugars. They are, however, more expensive than nitrated sugars.

Solutions of sugars in glycerine or in mixtures of glycerine with other polyhydric alcohols have been widely used in the manufacture of liquid explosive dynamite ingredients. The use of sugar possesses, on the one hand, the advantages of lowering the cost and depressing the freezing point of the nitrated product and, on the other hand, the disadvantages of lowering the stability and increasing the viscosity of the nitrated product, thereby making it more difficult to wash free of acid and settle to a low moisture content. In practice, a solution of about 20% sugar has been most extensively used. While efforts have been made to introduce other carbohydrates in place of sucrose, this carbohydrate in the form of cane or beet sugar is by far the most satisfactory, considering price, purity, supply, stability, yield, explosive properties, etc.

In the case of sucrose it has not been practical to use more than 20% sugar without special equipment. Even with special apparatus and the observance of special precautions, 25% sugar solution seems to be the practical maximum (U. S. Patent No. 1,478,588, granted to Ernest M. Symmes, December 25, 1923).

The factors which have limited the proportion of sugar in the past are as follows:—

1. With glycerine or glycerine-diglycerine mixtures the use of more than 20% sucrose, either dissolved or suspended, gives a nitrated oil of such high viscosity that it is impractical without special equipment and process to purify, stabilize and settle to low moisture content.

2. With glycerine-diglycerine mixtures the use of more than 20% sucrose either dissolved or suspended gives a nitrated product of undesirably low sensitiveness.

3. With glycerine, diglycerine, ethylene glycol or mixtures of these polyhydric alcohols, the solubility of sucrose is so low that the dissolution of more than 25% cannot be accomplished without great danger of scorching the solution, and the solution, if prepared, does not stand a practical length of time without crystallization taking place.

The composition of a saturated solution of cane sugar in glycerine, ethylene glycol, or mixtures of these at normal room temperature, for example 70° F., is about 8% to 10% sugar and 92% to 90% glycerine or ethylene glycol, although super-saturated solutions containing 20% to 25% sugar will stand at room temperature considerable time before crystallizing. The preparation of a solution of more than 25% sugar in glycerine, diglycerine or ethylene glycol seems impractical because the higher temperature required scorches the solution. The use of over 25% solution seems impractical because of the relatively rapid rate of crystallization at room temperature and because scorching takes place if the solution is stored above the temperature of the saturation point. Scorched solutions cause separation and washing troubles in preparing the nitrated product.

Ethylene glycol has recently become available in commercial quantities for use in the preparation of explosive oils. The introduction of this material in glycerine-sugar or glycerine-glucoside mixtures gives a nitrated product of lower viscosity, which is more readily purified and which produces dynamites of increased sensitiveness. Therefore, in the presence of ethylene glycol dinitrate, larger proportions of nitrated sugars or nitrated glucosides may be satisfactorily used.

As stated above, nitrated sucrose is more economical than nitrated glucosides. It is, therefore, desirable to obtain the full advantage of sucrose by using the practical maximum proportion and then to use a glucoside in solution with the sucrose. The proportion of sucrose which it is practical to use satisfactorily in solution in a polyhydric alcohol or mixtures of polyhydric alcohols depends upon both the solubility of sucrose in the solvent and the viscosity of the solution.

I have discovered that by dissolving in a polyhydric alcohol medium a glucoside in addition to the sucrose, the practical maximum proportion of sucrose may be retained in solution in addition to substantial proportions of glucoside and that these solutions on nitration produce explosive oils suitable for use in commercial explosive compositions.

The following specific example is given to illustrate my process:—For reasons stated above, 25 parts sucrose in 75 parts polyhydric alcohol is the maximum proportion of sucrose which it is practical to satisfactorily use in this solvent. In applying my process, a solution of 25 parts sucrose and 15 parts glucoside, for example, the dextrose-glucoside of methyl alcohol, in 60 parts ethylene glycol may be used. The solution is subjected to the action of a mixture of sulfuric and nitric acids. The nitrated product is allowed to separate in the usual way. It is drawn off and washed with water, sodium carbonate solution and sodium chloride solution. A stabilizer, such as for example diphenylamine, may be added. Additional washes, purification and stabilization may be used if desired. The nitration, purification and stabilization are essentially the same as for a 20% solution of sucrose in glycerine. The product obtained is satisfactory for use in commercial explosive compositions.

In addition to the above example, the following further illustrate compositions which may be employed in carrying out my process:—

25% sucrose.
15% dextrose-glucoside of methyl alcohol.
30% ethylene glycol.
30% glycerine.

20% to 25% sucrose.
10% to 30% dextrose-glucoside of methyl alcohol.
45% to 70% ethylene glycol.

20% to 25% sucrose.
10% to 30% dextrose-glucoside of methyl alcohol.
20% to 60% ethylene glycol.
20% to 50% glycerine.

In place of the dextrose-glucoside of methyl alcohol, another glucoside may be used such as the hexose-glucoside of ethyl alcohol or the glucosides of polyhydric alcohols or a mixture of glucosides may be used. In place of ethylene glycol, another glycol or mixture of glycols may be used, or any polyhydric alcohol solvent such as diglycerine may be introduced.

The practical maximum proportion of sucrose will vary somewhat depending upon the polyhydric alcohol solvent and also upon the viscosity and the temperature of storage of the solution.

The composition of the nitrated explosive may be approximately calculated by means of the following yields on the individual ingredients:—2.30 for glycerin and glycol, 1.85 for sucrose and 1.34 for dextrose-glucoside of methyl alcohol. This is illustrated as follows:

|  | Before nitration | Yield | After nitration | |
|---|---|---|---|---|
|  |  |  | Parts | Per cent composition |
|  | Per cent |  |  | Per cent |
| Sucrose | 25 | 1.85 | 46.25 | 22.63 |
| Glucoside | 15 | 1.34 | 20.10 | 9.83 |
| Glycol | 30 | 2.30 | 69.00 | 33.77 |
| Glycerin | 30 | 2.30 | 69.00 | 33.77 |
|  | 100 |  | 205.35 | 100.00 |

Similar calculations may readily be made for other compositions.

While I have described my invention and given detailed and specific examples, I do not limit myself to the carbohydrates, glucosides and polyhydric alcohols mentioned nor to the proportions given, but include within the scope of my invention the use of any highly soluble glucoside which may be used in addition to sucrose.

I claim:

1. A process of manufacturing an explosive which comprises nitrating a solution of glucoside and polysaccharide in polyhydric alcohol.

2. A process of manufacturing an explosive which comprises nitrating a solution of glucoside and disaccharide in polyhydric alcohol, said solution containing more than 20% of disaccharide.

3. A process of manufacturing an explosive which comprises nitrating a solution of glucoside and sucrose in polyhydric alcohol, said solution containing more than 20% of sucrose.

4. Invention of claim 3 where the glucoside is dextrose-glucoside of methyl alcohol.

5. Invention of claim 3 where the polyhydric alcohol is ethylene glycol.

6. A process of manufacturing an explosive which comprises nitrating a solution of about 25% sucrose and 10% to 20% glucoside in a polyhydric alcohol.

7. A process of manufacturing an explosive which comprises nitrating a solution of about 25% sucrose and approximately 15% dextrose-glucoside of methyl alcohol in ethylene glycol.

8. An explosive comprising nitrated glucoside, nitrated polysaccharide and a nitrated polyhydric alcohol.

9. An explosive comprising nitrated glucoside, nitrated disaccharide and a nitrated polyhydric alcohol.

10. An explosive comprising nitrated glucoside, more than 16% nitrated disaccharide, and a nitrated polyhydric alcohol.

11. An explosive comprising approximately 23% nitrated sucrose, 6% to 14% nitrated glucoside, and 63% to 72% nitrated polyhydric alcohol.

12. An explosive comprising approximately 22% nitrated sucrose, 10% nitrated dextrose-glucoside of methyl alcohol, and 68% nitrated ethylene glycol.

In testimony whereof, I affix my signature.

PHILIP G. WRIGHTSMAN.